United States Patent
Liu et al.

(10) Patent No.: US 8,223,432 B2
(45) Date of Patent: Jul. 17, 2012

(54) OPTICAL SHEET, DISPLAY APPARATUS AND FABRICATING METHOD THEREOF

(75) Inventors: Wei-Chih Liu, Taichung (TW); Jie-Shiung Yang, Taoyuan County (TW)

(73) Assignees: Taiwan TFT LCD Association, Hsinchu (TW); Chunghwa Picture Tubes, Ltd., Taoyuan (TW); Au Optronics Corporation, Hsinchu (TW); Hannstar Display Corporation, New Taipei (TW); Chi Mei Optoelectronics Corporation, Tainan County (TW); Industrial Technology Research Institute, Hsinchu (TW)

( * ) Notice: Subject to any disclaimer, the term of this patent is extended or adjusted under 35 U.S.C. 154(b) by 609 days.

(21) Appl. No.: 12/344,276

(22) Filed: Dec. 25, 2008

(65) Prior Publication Data

US 2010/0103520 A1  Apr. 29, 2010

(30) Foreign Application Priority Data

Oct. 24, 2008  (TW) ................................ 97140926 A (51) Int. Cl.
   *G02B 5/30* (2006.01)
(52) U.S. Cl. .......... 359/489.01; 359/489.07; 359/494.01
(58) Field of Classification Search .............. 359/486.01, 359/489.01, 489.07, 494.01; 349/96
   See application file for complete search history.

(56) References Cited

U.S. PATENT DOCUMENTS 5,479,282 A * 12/1995 Toko et al. .................... 349/123
2004/0008298 A1 * 1/2004 Kwok et al. .................... 349/96
2005/0286038 A1 * 12/2005 Albert et al. .................... 355/71
2008/0049321 A1 * 2/2008 McEldowney et al. ........ 359/494
2008/0137189 A1 * 6/2008 Shih .............................. 359/489
2008/0137190 A1 * 6/2008 Shih .............................. 359/494
2010/0149638 A1 * 6/2010 Kashima et al. ............... 359/500

FOREIGN PATENT DOCUMENTS

| CN | 1896782 | 1/2007 |
| CN | 101034226 | 9/2007 |
| CN | 101183177 | 5/2008 |
| GB | 2088078 | 6/1982 |
| JP | 6-160628 | 6/1994 |

OTHER PUBLICATIONS

Seiberle, et al., "Photo-Aligned Anisotropic Optical Thin Films", SID International Symposium Digest of Technical Papers, 2003, vol. 34, pp. 1162-1165.*

* cited by examiner

Primary Examiner — Frank Font
(74) Attorney, Agent, or Firm — Jianq Chyun IP Office (57) ABSTRACT

An optical sheet suitable for linear polarized light to pass through is provided. The optical sheet includes a substrate and a retardation film. The retardation film herein is located on the substrate and has a plurality of optical axes with different extending directions. The linear polarized light after passing through the retardation film is converted into a plurality of linear polarized light with different polarization directions, wherein the retardation film substantially has a phase retardation of λ/2 at anywhere of the area where the linear polarized light passes through and λ is the wavelength of the linear polarized light. Besides, the present invention also provides a display apparatus, a fabricating method of an optical sheet and a fabricating method of a display apparatus.

19 Claims, 11 Drawing Sheets

OPTICAL SHEET, DISPLAY APPARATUS AND FABRICATING METHOD THEREOF

CROSS-REFERENCE TO RELATED APPLICATION

This application claims the priority benefit of Taiwan application serial no. 97140926, filed on Oct. 24, 2008. The entirety of the above-mentioned patent application is hereby incorporated by reference herein and made a part of this specification.

BACKGROUND OF THE INVENTION

1. Field of the Invention

The present invention generally relates to an optical sheet, a display apparatus and a fabricating method thereof, and more particularly, to an optical sheet able to provide the transmitted light at different regions thereof with different linear polarization directions, a display apparatus employing the above-mentioned optical sheet and a fabricating method thereof.

2. Description of Related Art

Along with the increasing progresses of display technology, people enjoy the daily life with great convenience by means of display apparatuses, wherein the flat panel display (FPD) has dominated the present display market due to the overwhelming advantage of light and thin design feature. Among various FPDs, the liquid crystal display (LCD) is the most favorable by customers due to advantages of high space utilization, low power consumption, no radiation and low electromagnetic interference thereof.

Figure 1:
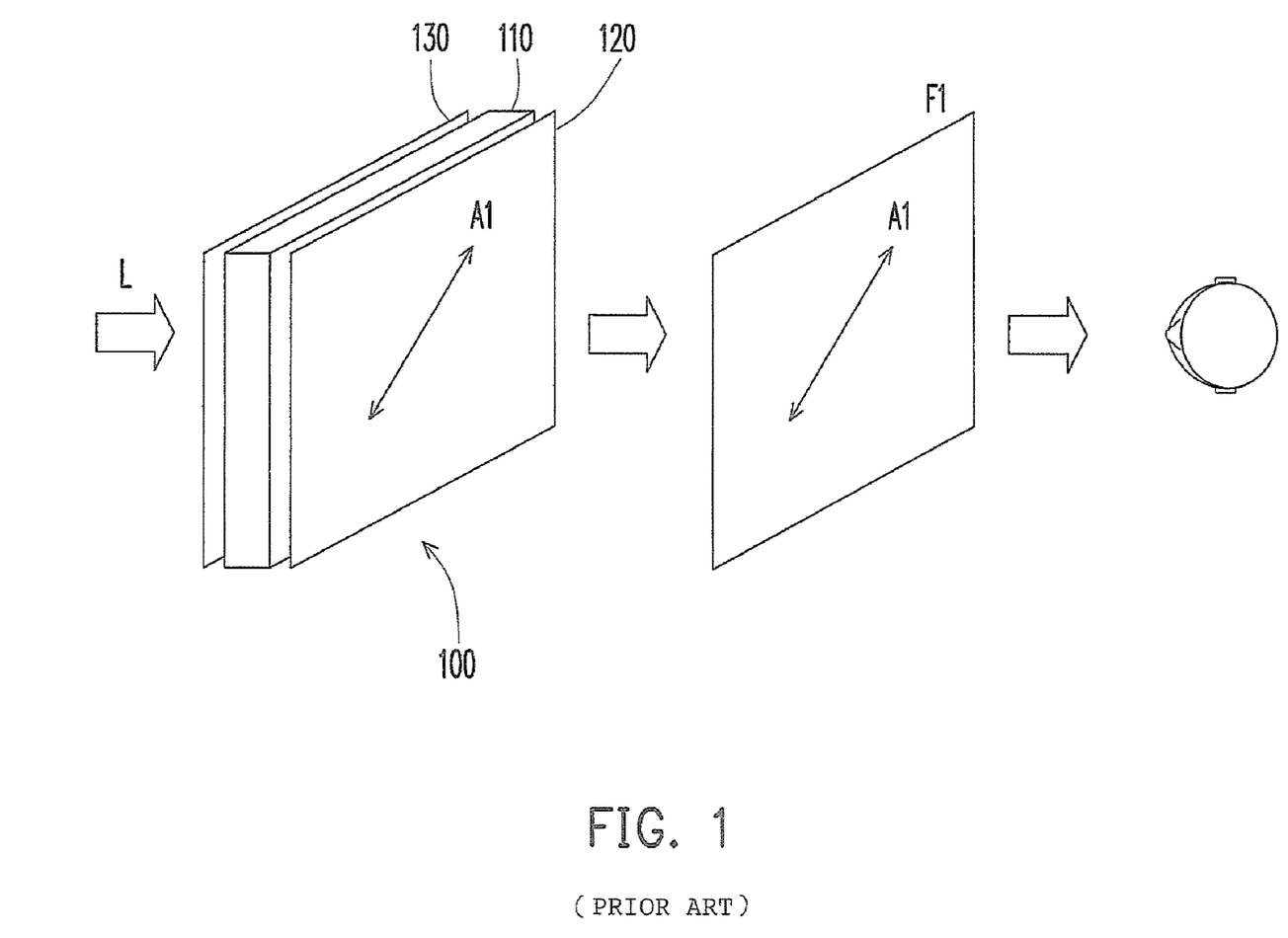
FIG. 1 is a sectional view diagram of a conventional LCD.

FIG. 1 is a sectional view diagram of a conventional LCD. Referring to FIG. 1, an LCD 100 includes a liquid crystal display panel (LCD panel) 110, an upper polarizing plate 120 and a lower polarizing plate 130, wherein the upper polarizing plate 120 and the lower polarizing plate 130 respectively have a transmitting axis with an extending direction D. When light L travels through the lower polarizing plate 130, the LCD panel 110 and the upper polarizing plate 120, the light L is emitted out of the upper polarizing plate 120 taking a form of linear polarized light with a polarization direction A1, and the transmittance of the light at a region in the LCD panel can be controlled by adjusting the revolving direction of the liquid crystal molecules of the region so as to make the LCD produce different display effects.

However, the whole image displayed by the above-mentioned LCD is a linear polarization image along the direction A1, as shown by the frame F1 in FIG. 1. A viewer durably watching the linear polarization images of an LCD with a fixed polarization direction would feel visual fatigue easily, so that the above-mentioned problem needs to be solved.

SUMMARY OF THE INVENTION

The present invention provides an optical sheet suitable for a linear polarized light to pass through the optical sheet, and the optical sheet includes a substrate and a retardation film. The retardation film herein is located on the substrate and has a plurality of optical axes with different extending directions, and the linear polarized light after passing through the retardation film is converted into a linear polarized light with a plurality of different polarization directions, wherein the retardation film substantially has a phase retardation of $\lambda/2$ at anywhere of an area where the linear polarized light passes through and $\lambda$ is the wavelength of the linear polarized light.

The present invention also provides a display apparatus, which includes a display panel and an optical sheet. The display panel herein has a polarizing plate and linear polarized light is emitted out of the polarizing plate of the display panel. The optical sheet is located on the polarizing plate and has a retardation film, wherein the retardation film has a plurality of optical axes with different extending directions, and linear polarized light after passing through the retardation film is converted into linear polarized light with a plurality of different polarization directions. The retardation film herein substantially has a phase retardation of $\lambda/2$ at anywhere of an area where the linear polarized light passes through and $\lambda$ is the wavelength of the linear polarized light.

The present invention further provides a fabricating method of an optical sheet. The fabricating method includes following steps. First, a substrate is provided. Next, a retardation film is formed on the substrate, wherein the retardation film has a plurality of optical axes with different extending directions, linear polarized light after passing through the retardation film is converted into linear polarized light with a plurality of different polarization directions, and the retardation film substantially has a phase retardation of $\lambda/2$ at anywhere of an area where the linear polarized light passes through and $\lambda$ is the wavelength of the linear polarized light.

The present invention further provides a fabricating method of a display apparatus. The fabricating method includes following steps. First, a display panel is provided, wherein the display panel has a polarizing plate and linear polarized light is emitted out of the polarizing plate of the display panel. Next, an optical sheet is formed on the polarizing plate and the optical sheet has a retardation film. The retardation film herein has a plurality of optical axes with different extending directions, linear polarized light after passing through the retardation film is converted into linear polarized light with a plurality of different polarization directions, and the retardation film substantially has a phase retardation of $\lambda/2$ at anywhere of an area where the linear polarized light passes through and $\lambda$ is the wavelength of the linear polarized light.

To make the above and other objectives, features, and advantages of the present invention more comprehensible, preferable embodiments accompanied with figures are detailed as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 2:
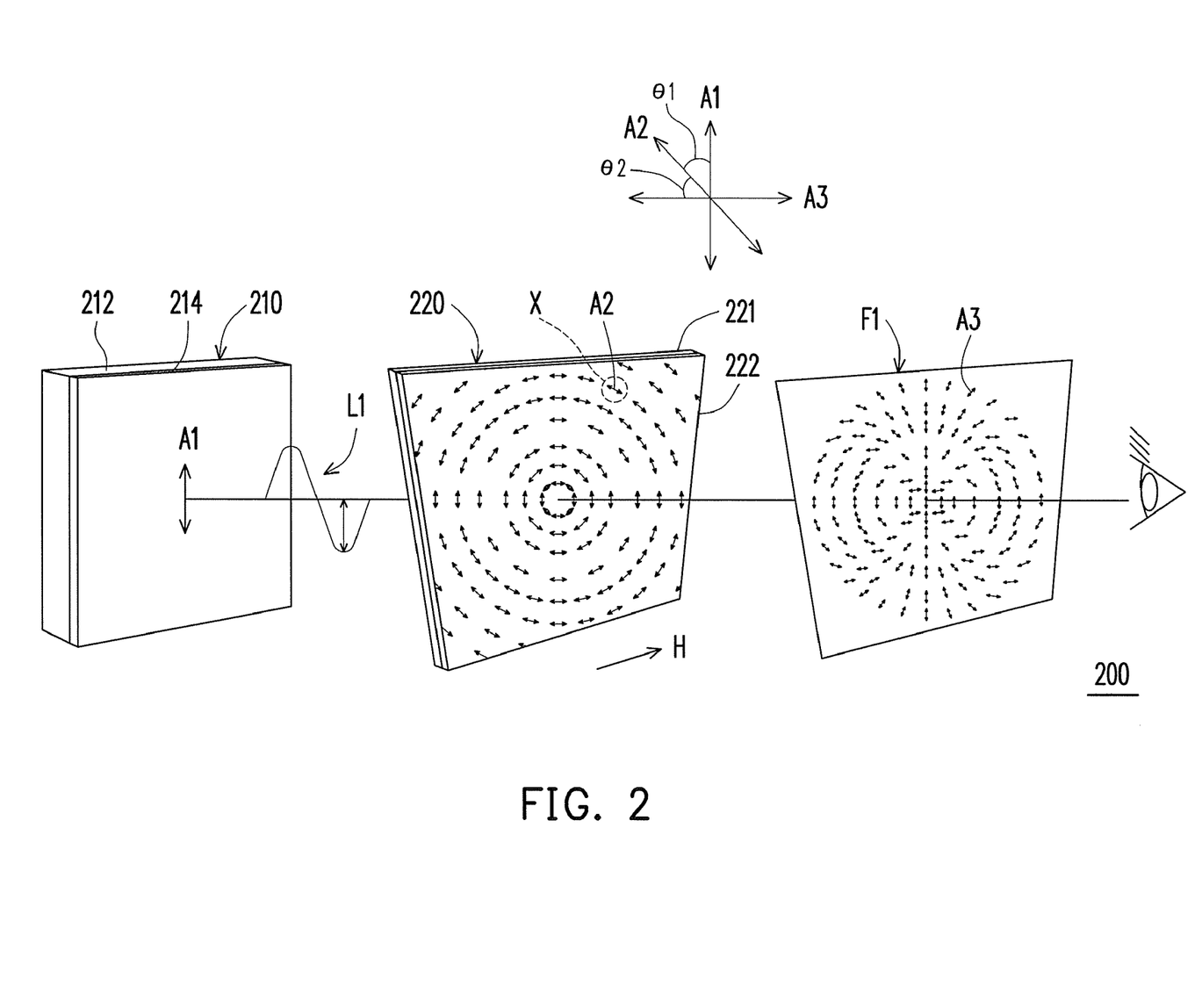
FIG. 2 is a diagram of a display apparatus with an integrated optical sheet according to an embodiment of the present invention.

FIG. 2 is a diagram of a display apparatus with an integrated optical sheet according to an embodiment of the present invention. Referring to FIG. 2, a display apparatus 200 includes a display panel 210 and an optical sheet 220. The display panel 210 is suitable to emit linear polarized light L1 with a polarization direction A1. In more detail, the display panel 210 in the embodiment mainly comprises a pixel array 212 and a polarizing plate 214 located between the pixel array 212 and the optical sheet 220, wherein the polarizing plate 214 has a transmitting axis parallel to a direction A1 so that an image displayed by the display panel 210 after passing through the polarizing plate 214 is converted into a linear polarization image with a polarization direction approaching A1. Specially, the optical sheet 220 has a retardation film 222, wherein the retardation film 222 has a plurality of optical axes A2 with different extending directions, and the retardation film 222 substantially has a phase retardation of $\lambda/2$ at anywhere of an area where the linear polarized light passes through and $\lambda$ is the wavelength of the linear polarized light. In this way, the linear polarized image with a polarization direction A1 is converted into an image produced by a plurality of linear polarized light with different polarization directions by means of the optical axes A2 with different extending directions of the retardation film 222.

In the embodiment, the optical axes A2, for example, are substantially arranged along the tangent loci of the concentric circles, wherein the concentric circles comprise a plurality of circles with different radiuses but the same center position. Taking a place X in FIG. 2 as an example, X herein represents an area of the retardation film 222 with extending directions A2 of the optical axes A2. When the linear polarized light L1 with a polarization direction A1 produced by the display panel 210 passes through the retardation film 222 with the extending directions A2 of the optical axes and a phase retardation of $\lambda/2$, the linear polarized light L1 is converted into linear polarized light with a plurality of polarization directions A3. The included angles $\theta 1$ herein between the polarization direction A1 and the extending directions A2 of the optical axes A2 are substantially equal to the included angles $\theta 2$ between the extending directions A2 of the optical axes A2 and the polarization directions A3.

Continuing to FIG. 2, the retardation film 222 with different optical axe directions A2 in different regions provides a phase retardation of half-wave $\lambda/2$ at each region corresponding to each optical axis direction A2, which enables a linear polarized image with a single polarization direction A1 converted into a linear polarized image with different polarization directions at different positions for a viewer to watch. As shown by the frame F1 in FIG. 2, although, in micro point of view, the frame F1 at different regions on the retardation film 222 respectively provides linear polarized light with a different polarization direction in response to different optical axes A2 of different extending directions; but in macro point of view, since the optical axes A2 are substantially overall distributed along the concentric circles in the retardation film 222 so that the frame F1 has a distribution of a plurality of optical axes similar to a field of magnetic figure. For a viewer watching the image through the optical sheet 220, the viewed image can be considered as a resultant image comprising a plurality of linear polarized light with different polarizing states. As a result, a viewer durably watching the display apparatus 200 is able to get an image almost similar to the natural light image. In this way, a viewer can watch the frames of the display apparatus 200 employing the optical sheet 220 of the present invention with great comfort.

The optical sheet 220 of the present invention is suitable for linear polarized light to pass through and includes a substrate 221 and a retardation film 222. In the above-mentioned embodiment, the substrate 221 can be a polarizing plate 214 directly disposed on the display panel 210. In other embodiments, the substrate 221 can be a substrate different from the polarizing plate 214, which the present invention is not limited to. The retardation film 222 is located on the substrate 221, wherein the retardation film 222 substantially has a phase retardation of $\lambda/2$ at anywhere of the area where the linear polarized light passes through and the retardation film 222 has a plurality of optical axes A2 with different extending directions. Based on the above described, the linear polarized light after passing through the retardation film 222 is converted into linear polarized light with a plurality of polarization directions.

Figure 3A:
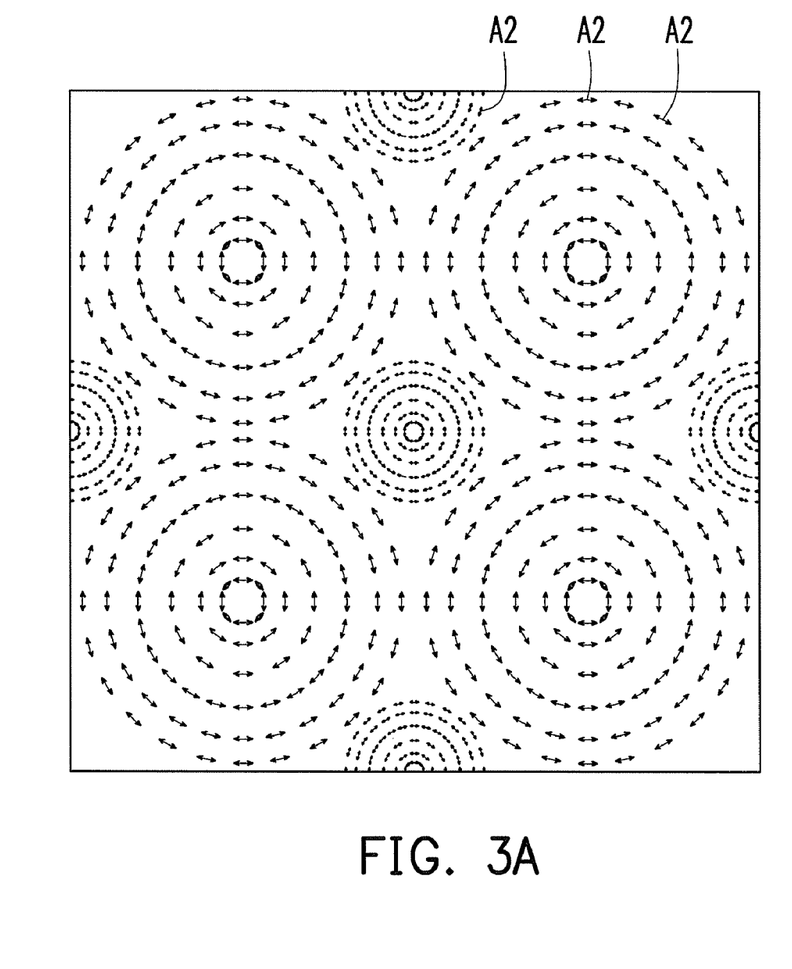
FIGS. 3A-3C are diagrams illustrating different distributions of optical axes in a retardation film.
Figure 3B:
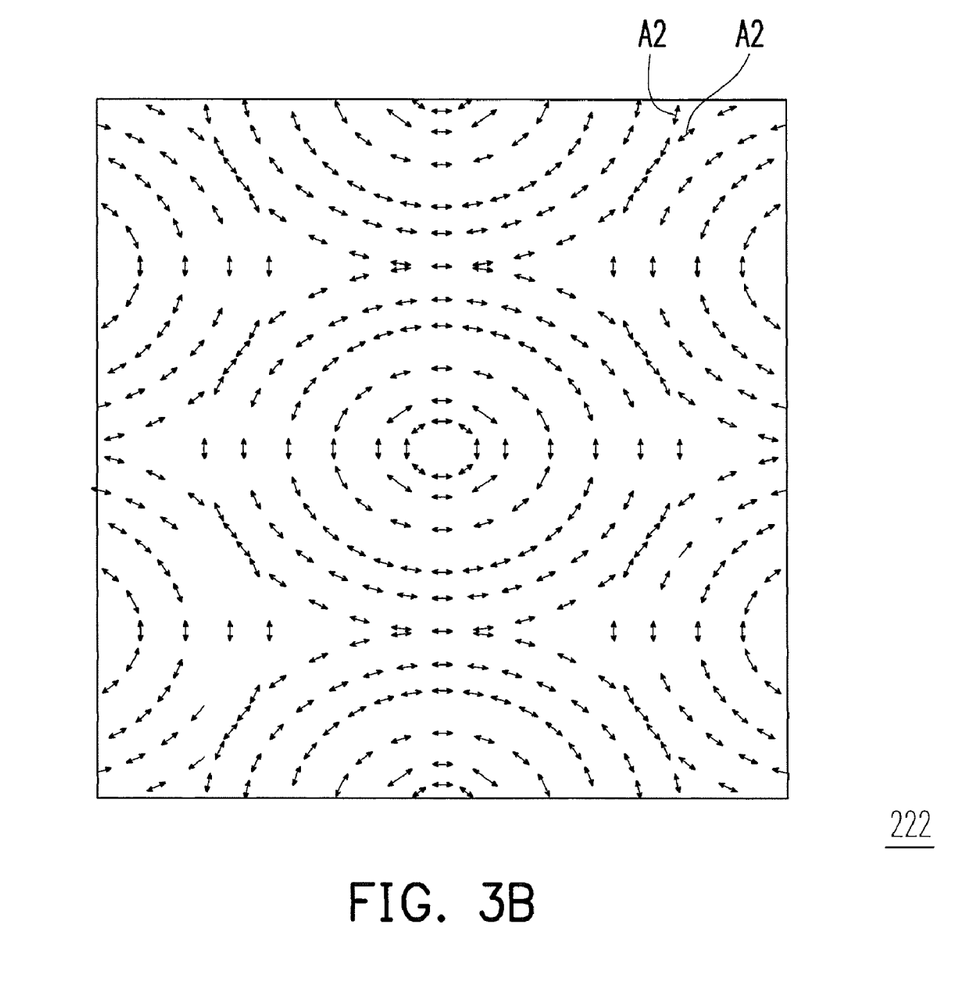
Figure 3C:
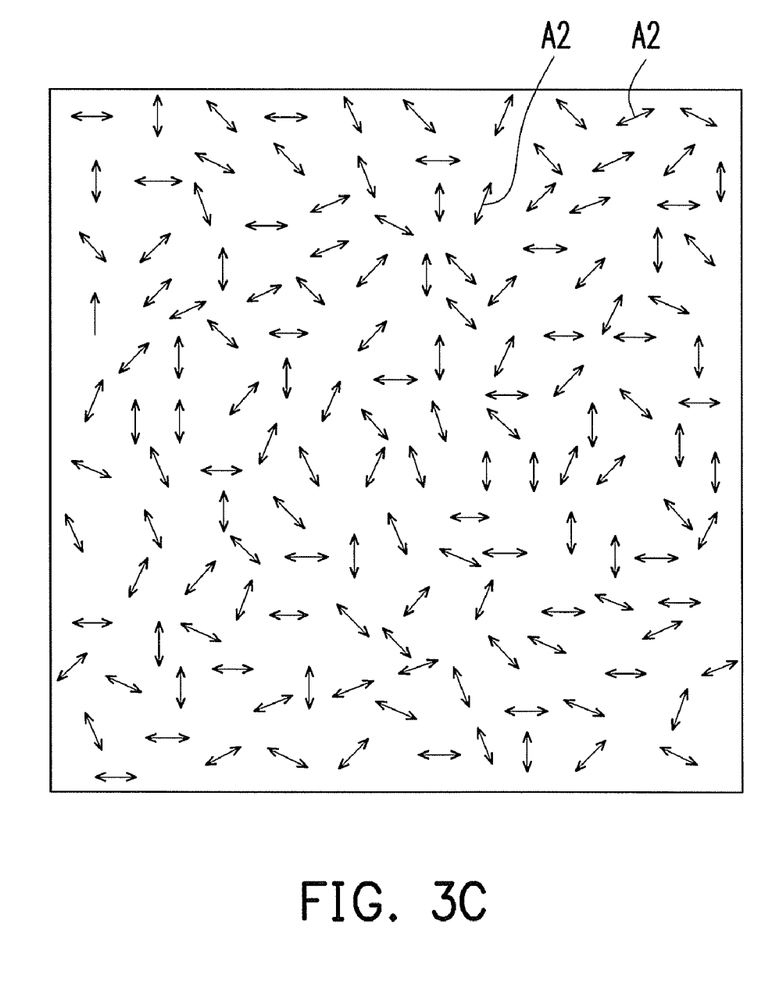

The included angles between any two optical axes A2 in the retardation film 222 ranges between 0° and 360° and the optical axes A2 have a plurality of distributions as shown in FIGS. 3A-3C. FIGS. 3A-3C are diagrams illustrating different distributions of optical axes in a retardation film. In more detail, as shown by FIGS. 3A and 3B, the optical axes A2 with different extending directions of the retardation film 222 are substantially distributed along the tangent loci of a plurality of concentric circles, wherein the concentric circles comprise a plurality of circles with different radiuses. In FIG. 3C however, the optical axes A2 of the retardation film 222 are randomly arranged. A designer should choose an appropriate distribution of the optical axes A2 of the retardation film 222 to suit the application requirement. In fact, the present invention does not limit the distribution type and figure, the magnitude and the arrangement mode. In other embodiments, the distribution of the optical axes A2 in the retardation film 222 can also be arranged to ellipse or polygon, wherein the polygon can be pentagon, hexagon or other polygons; and the individual figures can be arranged closely next to one another or arranged with spaces between. It should be noted that the optical sheet 220 of the present invention substantially provides a phase retardation equal to an integral multiple of half-wavelength ($n \times \lambda/2$) at an area where the linear polarized light passes through. In other words, the linear polarized light passing through any regions without arrow marks in FIGS. 3A-3C also gets a phase retardation equal to an integral multiple of half-wavelength.

Figure 4:
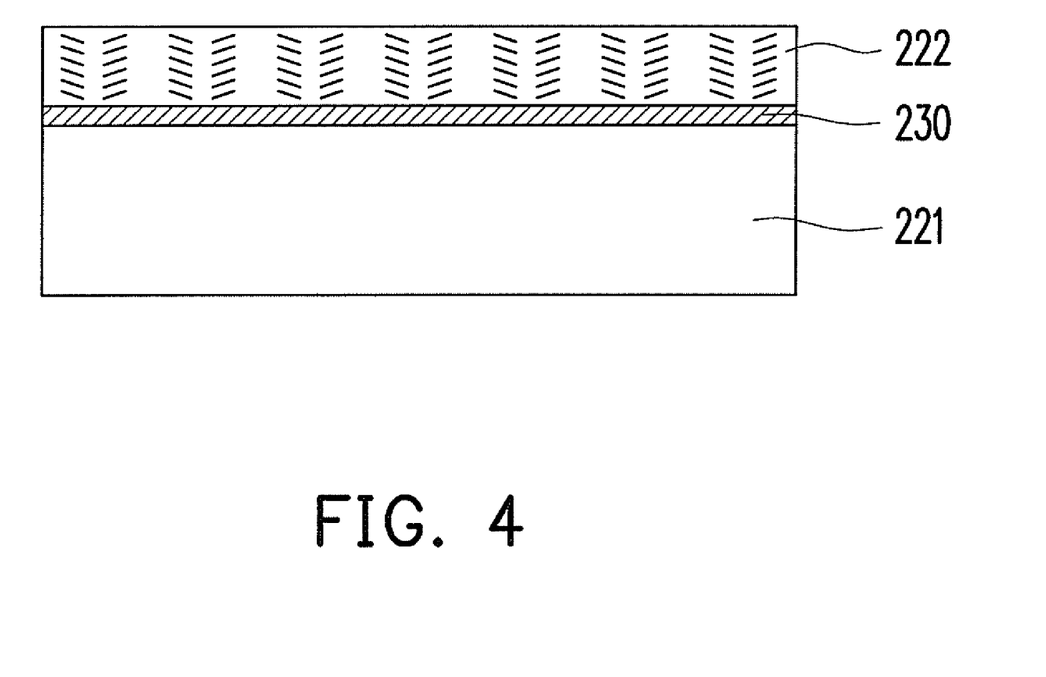
FIG. 4 is a sectional view diagram of an optical sheet provided by the present invention.

The retardation film 222 in the optical sheet 220 of the present invention is made of, for example, optical anisotropy material and the optical property of the retardation film 222 can be adjusted by changing the film thickness and the molecule arrangement of the optical anisotropy material, so that the travelling speed of light in the optical anisotropy film is different depending on different travelling directions in the film layer. For example, the optical anisotropy material is composed of substance in continuous phase morphology and has no particle phase, wherein the linear polarized light passing through an area of the retardation film 222 has the phase retardation $\lambda/2$ by keeping the film thickness of the optical anisotropy material to a predetermined dimension, and the retardation film 222 has the optical axes A2 with different extending directions by changing the molecule arrangement of the optical anisotropy material. FIG. 4 is a sectional view diagram of an optical sheet provided by the present invention. Referring to FIG. 4, the retardation film 222 has an alignment layer 230 located at a side of the retardation film 222 adjacent to the substrate 221 and a plurality of alignment structures with different extending directions, for example, grooves, are formed on the alignment layer 230. In an embodiment, the optical axes A2 of the retardation film 222 in the optical sheet 220 are defined by the alignment layer 230, wherein the alignment layer 230 has different alignment directions formed by using various contact alignment processes or contactless alignment processes. When an optical anisotropy material in continuous phase morphology is coated on the alignment layer 230, the molecules of the optical anisotropy material are sequentially arranged according to the alignment structures on the alignment layer 230 so as to define different a plurality of optical axes A2 with different extending directions. In the embodiment, the materials forming different optical axes A2 in the retardation film 222 are substantially located on a same plane in the alignment layer 230.

Figure 5A:
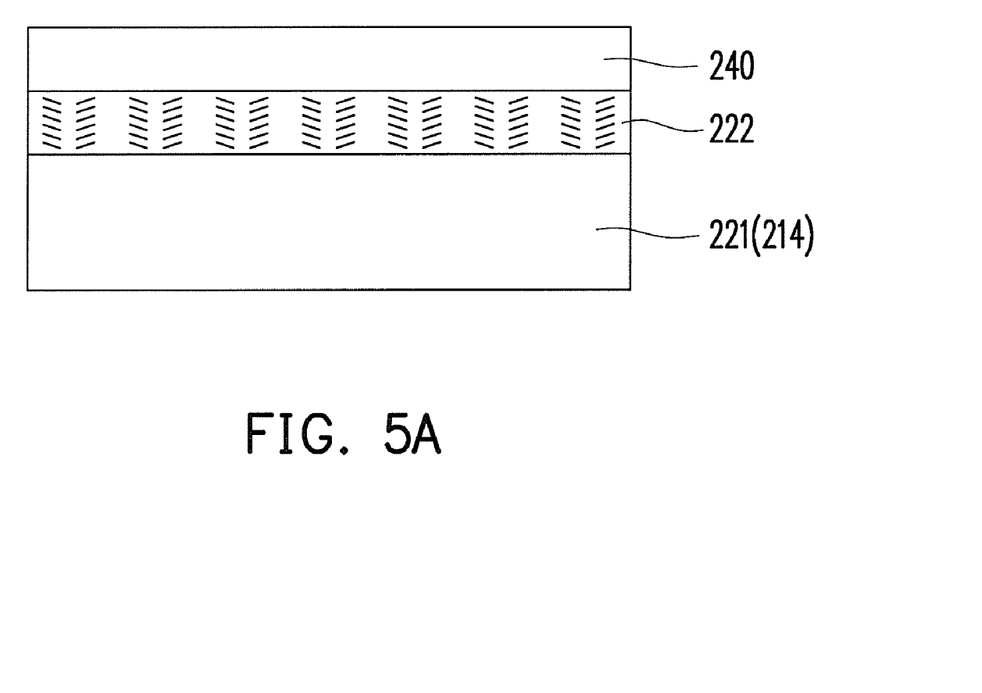
FIGS. 5A-5D are sectional view diagrams of several optical sheets provided by the present invention.
Figure 5B:
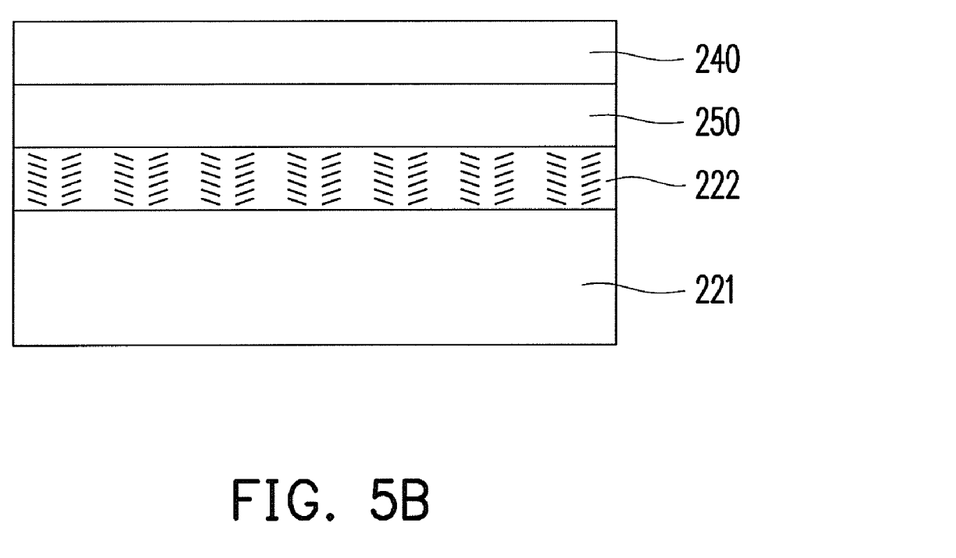
Figure 5C:
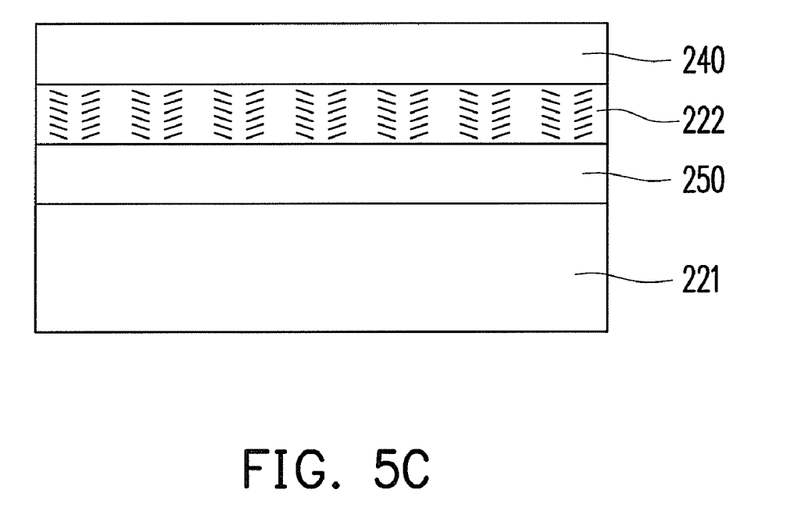
Figure 5D:
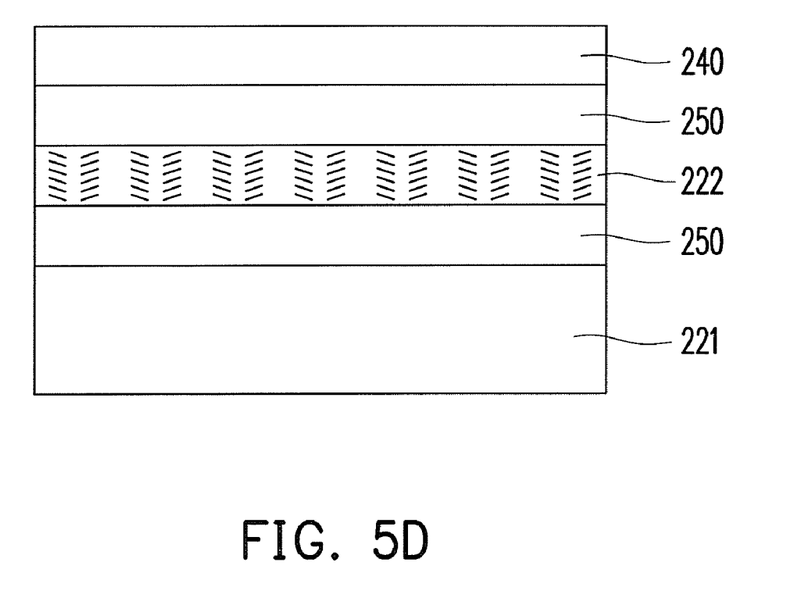

FIGS. 5A-5D are sectional view diagrams of several optical sheets provided by the present invention. In fact, a protection layer 240 can be optionally disposed over the optical sheet 220, so that the retardation film 222 is located between the protection layer 240 and the substrate 221 to protect the optical sheet 220 from external damage. As shown in FIG. 5A, the substrate 221 can be directly a polarizing plate 214 for linear polarizing or just a regular substrate 221. In some applications, the optical sheet 220 further includes an optical glue 250 to enhance the adhesive between film layers or improve the flatness, wherein the optical glue 250 can be disposed between the protection layer 240 and the optical sheet 220 as shown in FIG. 5B, or between the optical sheet 220. The present invention further provides a and the substrate 221 as shown in FIG. 5C, or both between the protection layer 240 and the optical sheet 220 and between the optical sheet 220 and the substrate 221 as shown in FIG. 5D depending on the application need.

The present invention further provides a fabricating method of the optical sheet 220, wherein an embodiment is described as follows. FIGS. 6A-6D are diagrams showing a fabricating method of an optical sheet provided by the present invention. The fabricating method of FIGS. 6A-6D includes following steps.

Figure 6A:
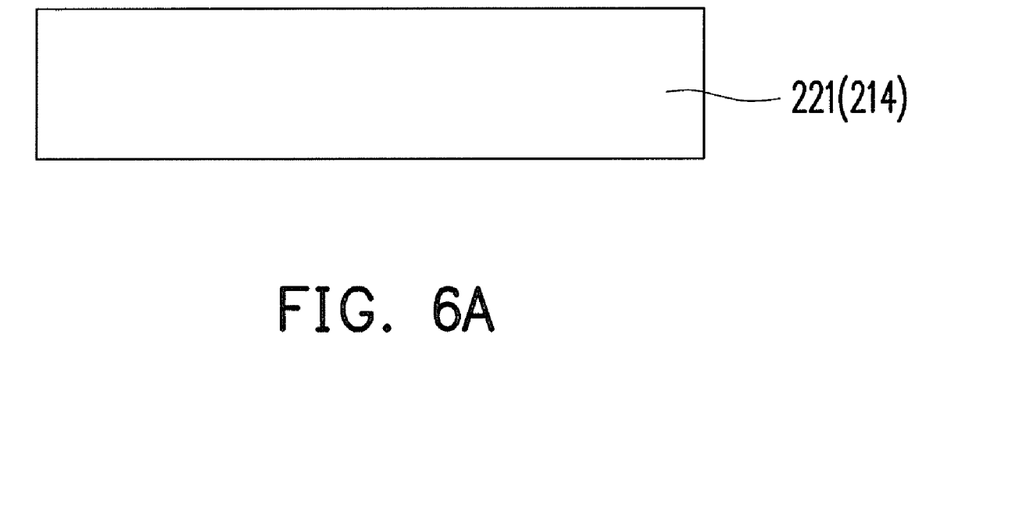
FIGS. 6A-6D are diagrams showing a fabricating method of an optical sheet provided by the present invention.
Figure 6B:
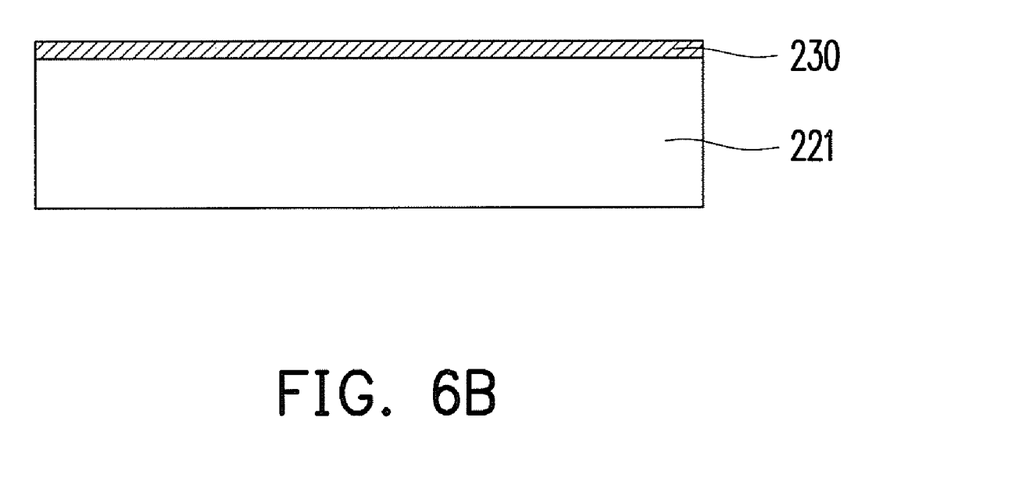

First, a substrate 221 is provided as shown in FIG. 6A, wherein the substrate 221 is, for example, a polarizing plate 214 or other appropriate material for supporting. Next, referring to FIG. 6B, prior to forming the retardation film 222, for example, the alignment layer 230 is formed on the substrate 221, wherein the alignment layer 230 has various different alignment directions for defining the optical axes A2 with different directions of the retardation film 222 formed in a successive process. The different alignment directions in the alignment layer 230 are completed by using various contact alignment processes or contactless alignment processes. The contact alignment process is that, for example, conducting friction alignment or imprinting alignment on the alignment layer 230 or directly on the surface of the substrate 221 by using alignment roller or imprinting mold. The contactless alignment process is that, for example, conducting ion beam alignment, photo alignment, plasma alignment or oblique evaporation so as to make the surface of the alignment layer 230 has anisotropy. It should be noted that the fabrication of the alignment layer 230 can be saved in the fabricating method of the optical sheet 220 of the present invention; instead, the required alignment structures with anisotropy are directly formed on the surface of the substrate 221 by using the above-mentioned steps.

Figure 6C:
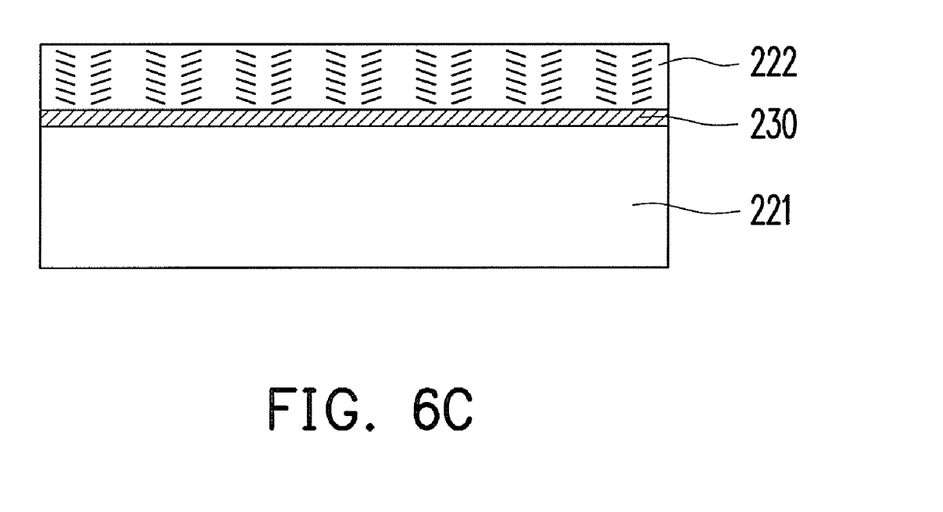
Figure 6D:
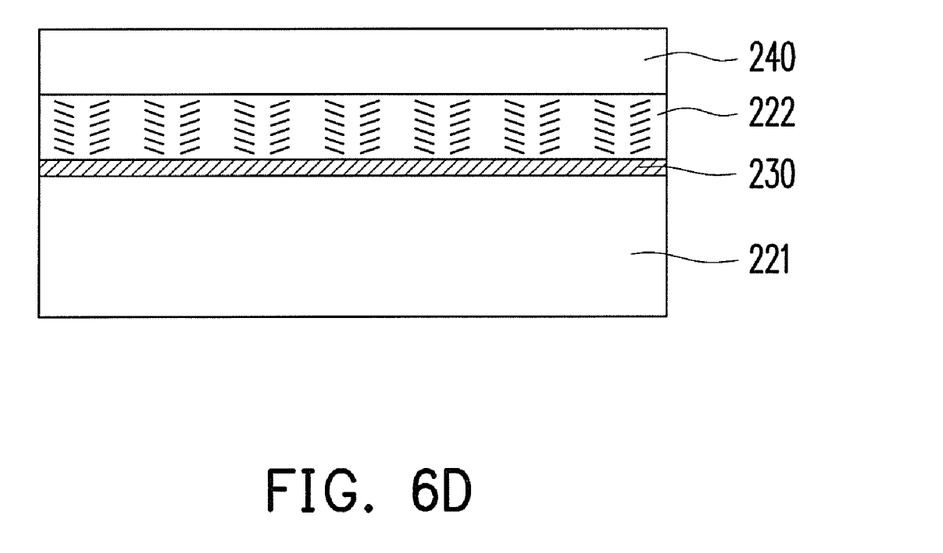

After that, the retardation film 222 is formed on the alignment layer 230 as shown in FIG. 6C, wherein the retardation film 222 can be made of liquid crystal material. To form the retardation film 222, for example, an optical anisotropy material is overall coated on the alignment layer 230 and the method of coating the retardation film 222 can be, for example, slot-die coating or spin coating. In this way, the molecules in the retardation film 222 tilt along the alignment directions of the base layer material to form a plurality of optical axes A2 with different extending directions, which enables single linear polarized light after passing through the retardation film 222 to be converted into linear polarized light with different polarization directions in response to the directions of the optical axes A2. Since the directions of the optical axes A2 in the retardation film 222 of the present invention are achieved by adjusting the arrangement of the molecules in the material, so that each region with a different direction of the optical axes A2 in the retardation film 222 can be controlled to reach a molecule scale, which results in much better optical effect. In addition, the retardation film 222 is composed of substance in continuous phase morphology, therefore, the formed film thickness is more even, which makes the retardation film 222 provide a phase retardation of $\lambda/2$ substantially and overall applied to anywhere of the area where the linear polarized light passes through, wherein $\lambda$ is the wavelength of the linear polarized light. In other words, based on the above described, the retardation film 222 provided by this invention has no region provided substantially no phase retardation and therefore can produce more uniform polarization effect for the incident linear polarized light.

Moreover, the protection layer 240 can be employed and disposed on the exterior layer of the retardation film 222 to prevent or lighten the possible damage of the retardation film 222 caused by surrounding moisture or mechanical action so as to keep the optical property of the retardation film unchanged. The protection layer 240 herein can be made of, for example, polyethylene terephthalate (PET). Certainly, an optical glue 250 with optical grade can be disposed between two film layers of the optical sheet 220, as shown in FIGS. 5A-5D, and it is omitted to describe for simplicity.

Figure 7A:
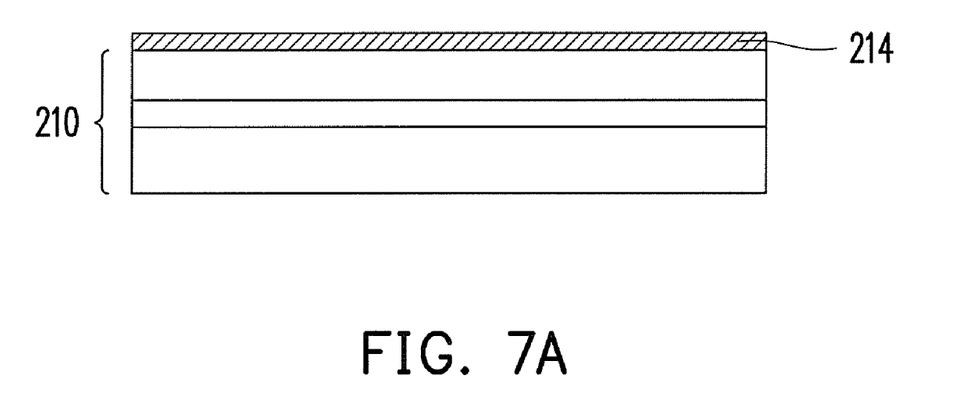
FIGS. 7A and 7B are diagrams showing a fabricating method of a display apparatus provided by the present invention.
Figure 7B:
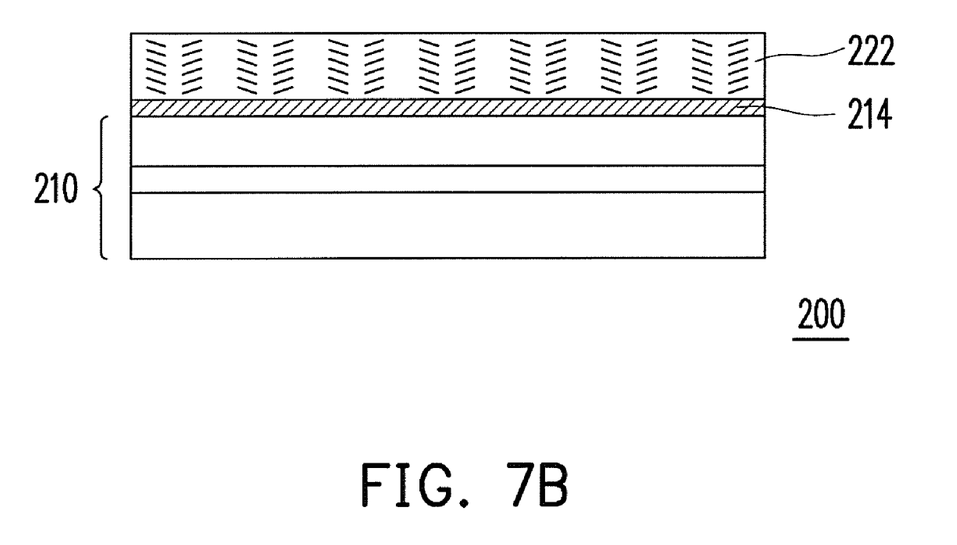

In applications, the optical sheet of the present invention can be directly used on a display panel to form a display apparatus, and the fabricating method of the display apparatus according to an embodiment of the present invention is described as follows. FIGS. 7A and 7B are diagrams showing a fabricating method of a display apparatus provided by the present invention. The fabricating method includes following steps.

First referring to FIG. 7A, a display panel 210 is provided, and the display panel 210 has a polarizing plate 214 and is suitable to display linear polarized light with single polarization direction. The display panel 210 is composed of, for example, an LCD panel and a polarizing plate. Next referring to FIG. 7B, an optical sheet 220 is formed on the polarizing plate 214. In the embodiment, different alignment structures with various alignment directions are directly formed on the surface of the polarizing plate 214 so as to form a plurality of optical axes A2 with different extending directions on the retardation film 222. With the retardation film 222, linear polarized light passing through the retardation film 222 would be converted into linear polarized light with a plurality of different polarization directions, wherein the retardation film 222 substantially has a phase retardation of $\lambda/2$ at anywhere of the area where the linear polarized light passes through and $\lambda$ is the wavelength of the linear polarized light. The method of forming the retardation film 222 can refer to the above described and is omitted to describe herein.

In summary, the optical sheet, the display apparatus and the fabricating method thereof provided by the present invention have at least following advantages:

1. The optical sheet of the present invention has a plurality of optical axes with different extending directions at different regions so that a better optical effect is provided. When the optical sheet is used in a display apparatus, a viewer durably watching the frames of the display apparatus feels less visual fatigue.

2. The fabricating method of the optical sheet and the display apparatus provided by the present invention is simple. In particular, the high quality optical sheet and the display apparatus can be made with lower cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical sheet, suitable for a linear polarized light to pass through, the optical sheet comprising:
   a substrate; and
   a retardation film, located on the substrate and having a plurality of optical axes with different extending directions to make the linear polarized light after passing through the retardation film converted into a plurality of linear polarized light with different linear polarization directions, wherein the optical axes in the retardation film are randomly arranged and each region with a different direction of the optical axes in the retardation film reaches a molecule scale, and the retardation film has a phase retardation of $\lambda/2$ at anywhere of an area where the linear polarized light passes through and $\lambda$ is the wavelength of the linear polarized light.

2. The optical sheet as claimed in claim 1, wherein a material of the retardation film is an optical anisotropy material, the composition of the optical anisotropy material is in continuous phase morphology and has no particle phase.

3. The optical sheet as claimed in claim 1, wherein the retardation film has an alignment layer therein located at a side of the retardation film adjacent to the substrate, and materials to form the optical axes in the retardation film are located on a same plane of the alignment layer.

4. The optical sheet as claimed in claim 1, wherein the substrate is a polarizing plate.

5. The optical sheet as claimed in claim 1, further comprising a protection layer, wherein the retardation film is located between the protection layer and the substrate.

6. The optical sheet as claimed in claim 5, further comprising an optical glue, wherein the optical glue is located between the protection layer and the substrate.

7. A display apparatus, comprising:
   a display panel, having a polarizing plate, the display panel suitable for emitting a linear polarized light out of the polarizing plate; and
   an optical sheet located on the polarizing plate, wherein the optical sheet has a retardation film, the retardation film has a plurality of optical axes with different extending directions to make the linear polarized light after passing through the retardation film converted into a plurality of linear polarized light with different linear polarization directions, wherein the optical axes in the retardation film are randomly arranged and each region with a different direction of the optical axes in the retardation film reaches a molecule scale, and the retardation film has a phase retardation of $\lambda/2$ at anywhere of an area where the linear polarized light passes through and $\lambda$ is the wavelength of the linear polarized light.

8. The display apparatus as claimed in claim 7, wherein a material of the retardation film is an optical anisotropy material, the composition of the optical anisotropy material is in continuous phase morphology and has no particle phase.

9. The display apparatus as claimed in claim 7, wherein the retardation film has an alignment layer therein located at a side of the retardation film adjacent to the substrate, and materials to form the optical axes in the retardation film are located on a same plane of the alignment layer.

10. The display apparatus as claimed in claim 7, further comprising a protection layer, wherein the retardation film is located between the protection layer and the polarizing plate.

11. The display apparatus as claimed in claim 10, further comprising an optical glue, wherein the optical glue is located between the protection layer and the polarizing plate.

12. A fabricating method of an optical sheet, comprising:
   providing a substrate; and
   forming a retardation film on the substrate, wherein the retardation film has a plurality of optical axes with different extending directions to make a linear polarized light after passing through the retardation film converted into a plurality of linear polarized light with different linear polarization directions, wherein the optical axes in the retardation film are randomly arranged and each region with a different direction of the optical axes in the retardation film reaches a molecule scale, and the retardation film has a phase retardation of $\lambda/2$ at anywhere of an area where the linear polarized light passes through and $\lambda$ is the wavelength of the linear polarized light.

13. The fabricating method of an optical sheet as claimed in claim 12, further comprising forming an alignment layer on the substrate prior to forming the retardation film, wherein the alignment layer has a plurality of alignment structures with different extending directions.

14. The fabricating method of an optical sheet as claimed in claim 12, wherein a method of forming the retardation film on the substrate comprises coating process.

15. The fabricating method of an optical sheet as claimed in claim 12, further comprising forming a protection layer on the retardation film after forming the retardation film so that the retardation film is located between the protection layer and the substrate.

16. The fabricating method of an optical sheet as claimed in claim 15, further comprising forming an optical glue on the substrate so that the optical glue is located between the substrate and the retardation film.

17. The fabricating method of an optical sheet as claimed in claim 15, further comprising forming an optical glue on the retardation film so that the optical glue is located between the protection layer and the retardation film.

18. A fabricating method of a display apparatus, comprising:
   providing a display panel, wherein the display panel has a polarizing plate and the display panel emits a linear polarized light out of the polarizing plate; and
   forming an optical sheet on the polarizing plate, wherein the optical sheet has a retardation film and the retardation film has a plurality of optical axes with different extending directions, the linear polarized light after passing through the retardation film converted into a plurality of linear polarized light with different linear polarization directions, wherein the optical axes in the retardation film are randomly arranged and each region with a different direction of the optical axes in the retardation film reaches a molecule scale, and the retardation film has a phase retardation of $\lambda/2$ at anywhere of an area where the linear polarized light passes through and $\lambda$ is the wavelength of the linear polarized light.

19. The fabricating method of a display apparatus as claimed in claim 18, further comprising forming a protection layer on the retardation film so that the retardation film is located between the protection layer and the substrate.

* * * * *